3,487,405
RADAR SYSTEM WITH DENSITY-ZONE
SUPPRESSOR
Fred Molho and Joel Soupirot, Paris, France, assignors to Thomson Informatique et Visualisation, Paris, France, a corporation of France
Filed Apr. 10, 1968, Ser. No. 720,071
Claims priority, application France, Apr. 12, 1967, 102,445
Int. Cl. G01s 9/02
U.S. Cl. 343—7     12 Claims

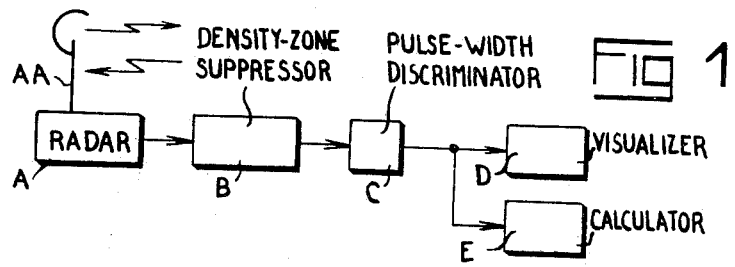
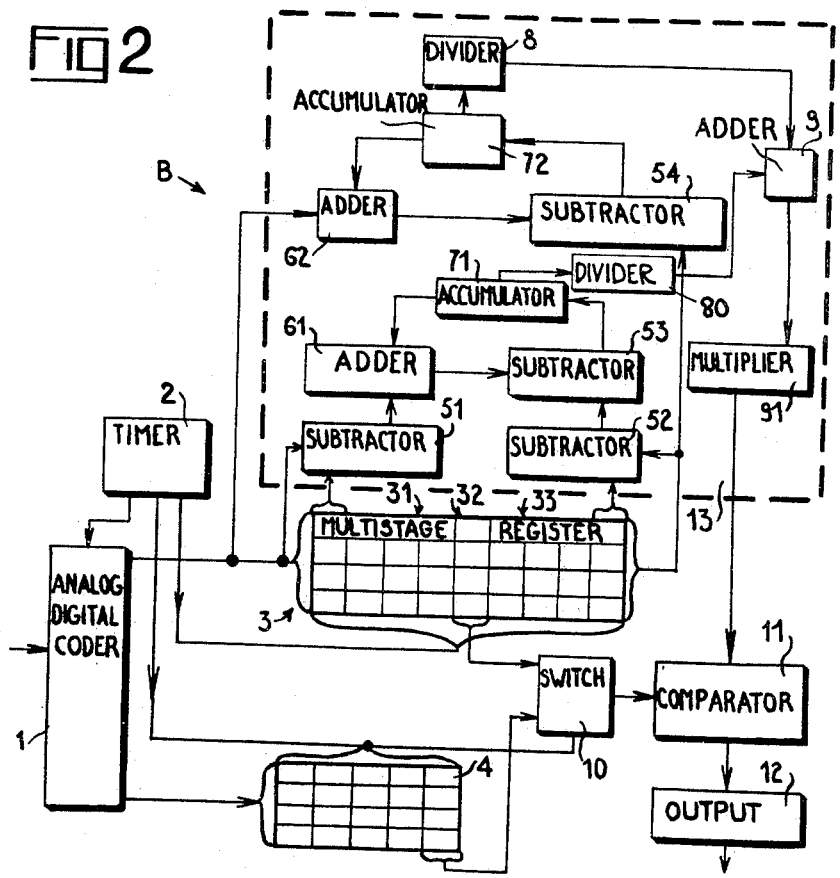

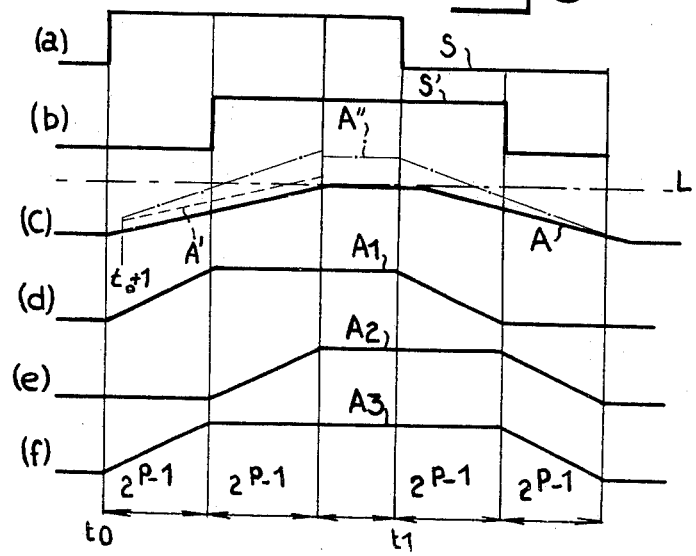
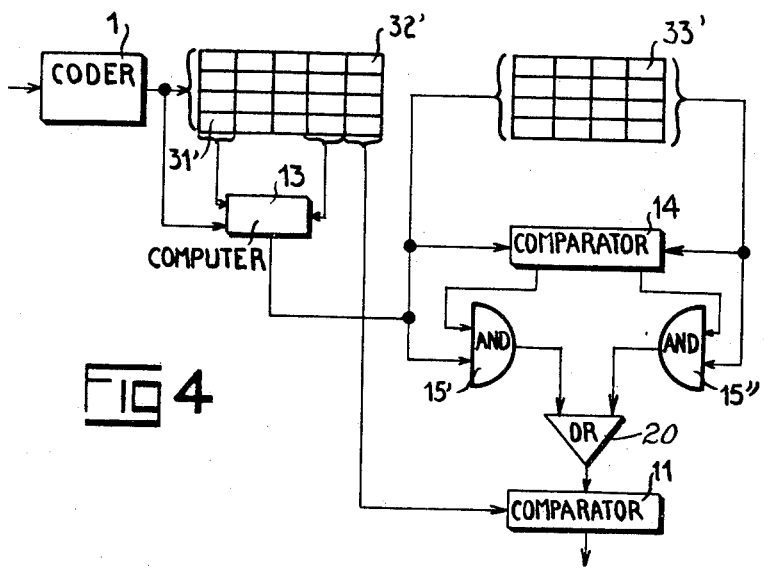

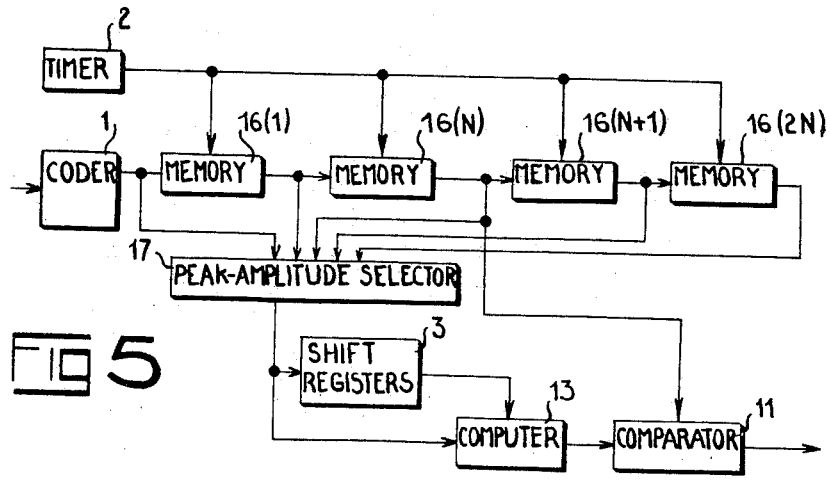
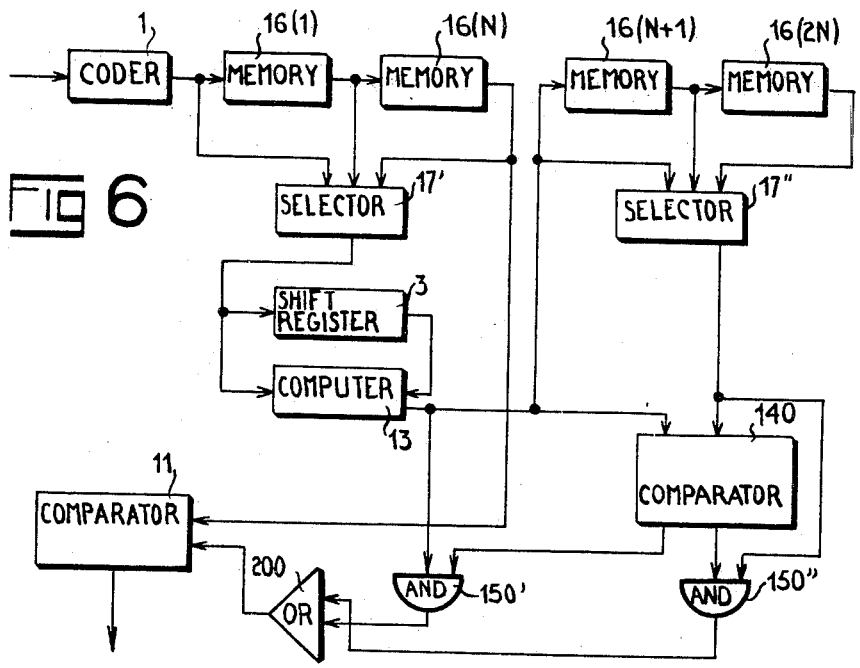

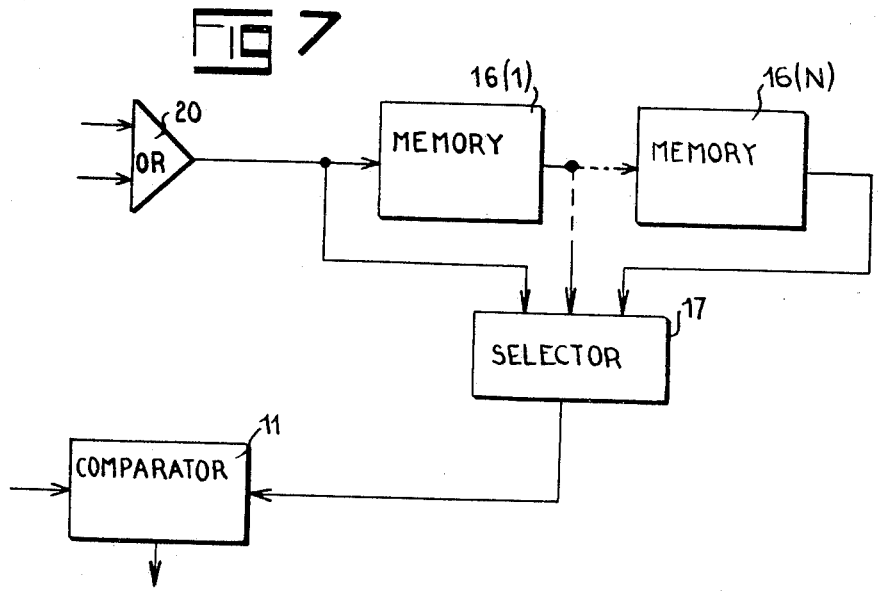
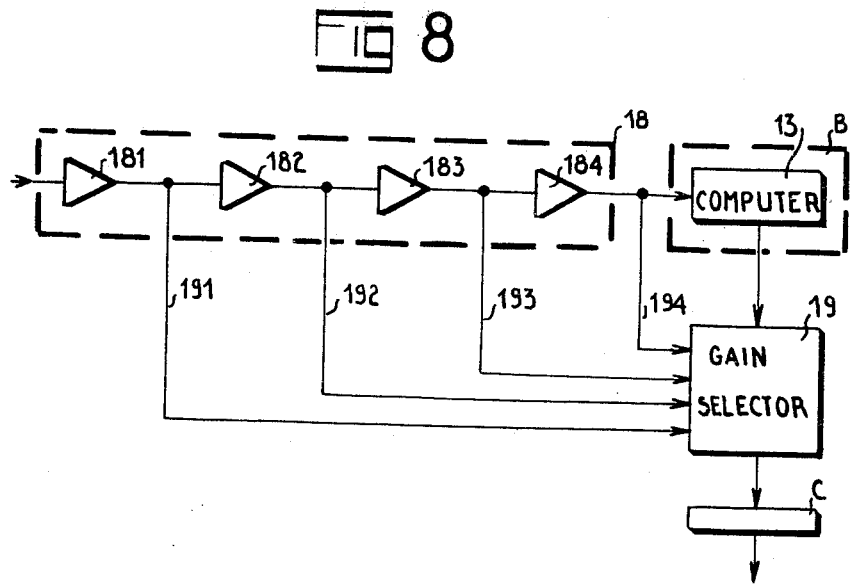

ABSTRACT OF THE DISCLOSURE

To suppress the effect of so-called density zones upon the output of a pulse-type radar system in which video signals are applied to a panoramic screen and/or a calculator, the amplitudes of received echo pulses are averaged over a period of $2^p$ clock cycles and the result is used as a reference signal to modify the amplitudes of these video signals, as by matching them against a threshold derived from the averaged amplitude. The video signal to be compared with the threshold may be a delayed echo pulse received midway within the period of averaging, the delay being thus equal to $2^{p-1}$ clock cycles. In computing the threshold, an additive value representing the total increments of echo amplitudes during that period may be taken into account. The reference signal may also be utilized to control the effective gain of an amplifier at the radar receiver.

---

Our present invention relates to a radar installation designed for the detection of isolated targets which may be surrounded by so-called density zones, i.e. regions occupied by elevated structures, cloud formations or other reflecting objects (including those referred to as "clutter" or "chaff") which tend to give rise to multiple echoes distributed over areas considerably wider than the targets. The effect of these density zones is to overload the radar receiver and mask the presence of true targets.

The hitherto proposed solutions to this problem include methods of manually or automatically establishing selected zones within the panoramic sweep of the radar transmitter in which the output of the associated receiver is blanked out; reference may be made in this connection to commonly owned French Patent No. 1,407,165 and U.S. Patent No. 3,129,426. These solutions, however, are applicable only to fixed density zones and also fail to take into account the different degrees of density so that a fluffy cloud bank and a massive mountain range may give rise to the same blanking effect. Thus, an airplane flying through clouds would escape detection by any radar system having a fixed blanking threshold responsive to scattered echoes from atmospheric disturbances and the like.

It is, therefore, the general object of our present invention to provide a radar system having means for establishing a variable blanking threshold or reference signal in order to discriminate against echoes from distributed reflectors while indicating the locations of isolated targets even in the presence of echoes from a surrounding density zone.

A more particular object is to provide, in a radar system with a panoramic sweep, means for testing the surveyed region for distributed echoes both in a radial and in an azimuthal direction.

These objects are realized, pursuant to our present invention, by the provision of register means—preferably a set of parallel shift registers—for the temporary storage, advantageously in binary form, of the magnitudes of a succession of incoming echo signals spread over a period of predetermined length, the magnitudes so stored being averaged in a computer which derives therefrom a reference signal for modifying the amplitudes of video signals applied to a load, such as a radar screen or a calculator, an increase in the value of the reference signal resulting in a reduction of the effective amplitude of these amplitudes or possibly in a complete suppression of the video signals. Thus, the reference signal may be used as a threshold to be matched against a delayed video signal generated by an echo pulse which occurred midway within the aforementioned period; alternatively, or in addition, this reference signal may be utilized to control the gain of an amplifier in the receiver to vary the signal amplitude in the desired sense.

More specifically, the shift registers may each have a multiplicity of stages and may be stepped by a timer at the end of consecutive clock cycles to shift the incoming and already stored signal information from one stage to the next, the duration $\tau$ of each clock cycle being a quantum which constitutes a small fraction of a video-pulse interval and which is preferably equal to the width of such a pulse. Thus, with $2^p+1$ stages per register, the system will explore at any instant a range window whose depth $\tau(2^p+1)$ should substantially exceed the dimensions of a target to be located. If, now, the the video signal to be fed to the load is taken from the $(2^{p-1}+1)^{\text{th}}$ stage of the set of registers, this video signal will produce a mark on the radar screen or a control signal for an associated calculator only if its amplitude is greater than the average of the signal amplitudes stored throughout the $2^p+1$ stages. This average can be conveniently determined by adding up the magnitudes entering the registers and subtracting from that total the magnitudes leaving the registers, the result being the sum of the magnitudes remaining at any time in the registers, and dividing that result by a fixed number equal or nearly equal to the number of register stages. In a binary computer, this division can be readily carried out by dropping the $p$ last-significant digits from the difference between the added and subtracted values.

According to a more specific feature of our invention, however, we may augment this average value by an addend representing the cumulative value of (e.g. positive) increments of echo amplitudes entering the registers, diminished by the sum of similar increments leaving the registers, the effect of this incremental addend being an accelerated adjustment of the threshold whenever the radar pulse encounters a reflecting object. The incoming and outgoing increments may be derived from respective subtractors differentially connected across the first and the last stages of the shift registers, the result being then averaged in the manner described above for the absolute amplitudes.

Even with this incremental addend, however, the output of the computer may be too low to constitute a satisfactory threshold; an additional safety margin may be provided by multiplying the absolute average, or the sum of that average and the cumulative increments of the stored magnitudes, by a factor $k$ ranging between 1 and 1.5; this factor may be introduced by a corresponding reduction of the divisor used in the averaging process.

In an analogous manner, the surveyed region may be explored for density zones along azimuthal windows also, in order to supplement the density information obtained from the radial sweep. An azimuthal window may be defined by a predetermined number of pulse intervals in which the received echo information is stored in a chain of memories, this information being shifted along the chain in the rhythm of the emitted video pulses by the associated timer. Thus, the individual memories of the chain may take the place of the several stages of the above-described shift registers and may be connected in like manner to the computer for the establishment of the threshold or reference signal; each of these memories must, of course, have a sufficient number of storage elements to register an echo amplitude during each clock cycle $\tau$ of a pulse interval, corresponding storage elements at the input end and the output end of the chain being concurrently scanned to supply the arriving and the delayed signal magnitudes to the computer. In many instances, especially in the presence of widely scattered reflectors, it will be desirable to combine the exploration in range with an exploration in azimuth, the range window being established in the afore-described manner with the aid of a set of multistage registers to which, however, the echo signals are fed not directly but via the chain of memories which are concurrently scanned and from whose instantaneous outputs the singal having the largest amplitude is selected for delivery to the shift registers.

The invention will be described in greater detail with reference to the accompanying drawing in which:

FIG. 1 is a block diagram of a radar system incorporating a density-zone suppressor according to our invention;

FIG. 2 is a more detailed diagram of the density-suppressor of FIG. 1;

FIG. 3 is a set of graphs serving to explain the operation of a modification of the system of FIG. 2;

FIG. 4 is a view generally similar to FIG. 2, illustrating the aforesaid modification; and FIGS. 5–8 are further diagrammatic views, illustrating additional modifications.

In FIG. 1 we have diagrammatically illustrated a radar transmitter and receiver A with a rotatable directional antenna AA representative of any conventional antenna array used in such systems. The receiver section of the radar installation A works into a density-zone suppressor B more fully described hereinafter. The output of suppressor B is delivered to a pulse-width discriminator C which in turn feeds a pair of loads connected in parallel, i.e. a visual indicator D (such as a panoramic radar screen) and a calculator E designed to control, for example, the operation of a craft carrying the system.

As shown in FIG. 2, the density-zone suppressor B comprises an analog-digital coder 1 which classifies the incoming echo signals as to $2^n-1$ amplitude levels and converts these amplitudes into corresponding binary signals of $n$ bits. A timer 2 generates a train of sharp clock pulses whose period $\tau$ defines a quantum which is short in comparison with the interval between successive video pulses emitted by antenna AA of FIG. 1. At the beginning of each clock cycle, coder 1 is sampled to discharge any echo-signal information it may contain, this information being delivered to the input of a set of $n$ parallel shift registers 3 of $2^p+1$ stages each. The register stages may be constituted by flip-flops in a manner well-known per se. These $2^p+1$ stages are divided into two groups 31, 33 of $2^{p-1}$ stages each, separated by a middle section 32 which represents the $(2^{p-1}+1)^{th}$ stage of each register. The video signals arriving at intermediate section 32, delayed by $2^{p-1}$ clock cycles $\tau$ in register section 31, are fed to a comparator 11 by way of a switch 10 also controlled by the timer 2. A set of $n$ auxiliary registers 4, similar to register section 31 and containing the same number of stages $(2^{p-1})$, receive the output of coder 1 in parallel with registers 3; the output end of registers 4, representing the $(2^{p-1}+)^{th}$ stage thereof, is also delivered to switch 10 for transmission to comparator 11. This comparator has an output circuit 12 connected to the discriminator C of FIG. 1; output circuit 12 may include a conventional matrix for the reconversion of binary signals or "words" to analog voltages.

A computer 13, connected to receive video information from both the input and the output of registers 3, generates a threshold value which, also in binary form, is supplied to another input of comparator 11. Computer 13 includes a first adder 62, with an addend input connected directly to the output of coder 1, and a subtractor 54 having a subtrahend input connected to the output of the registers 3. Signals entering the registers 3 during any clock cycle are transmitted by adder 62 to the minuend input of subtractor 54; $2^p+1$ clock cycles later, these same signals reach the subtrahend input of the subtractor. The resulting difference is fed to an accumulator 72 which supplies them, once per clock cycle, to the augend input of adder 62 for additive combination with the incoming signals arriving at the addend input; during subsequent cycles, the sum produced by adder 62 is recycled through units 54, 72 and 62 until increased or diminished by incoming or outgoing binary signals or "words." Also, the sum stored at any time in accumulator 72 is transmitted to a divider 8 which, by dropping the $p$ least-significant bits, divides this sum by $2^p$ (thus by a number substantially equal to the sum of stages in registers 3). The output of divider 8 represents therefore, with good approximation, the average value of the magnitudes stored at any time in the several stages of registers 3.

Another subtractor 51 is connected across the first stage of each register 3 to ascertain the increment in signal strength upon the reception of echo pulses during one or more clock cycles; this subtractor may be designed to consider only positive increments. A similar subtractor 52, also responsive to positive increments, is connected across the last stage of each register 3. The output of subtractor 51, which is a measure of the gradient of the incoming signal, is delivered via an adder 61 to yet a further subtractor 53 which also receives the output of subtractor 52. Subtractor 53 works into an accumulator 71 forming a closed loop with it and with adder 61 in a manner analogous to that of units 62, 54 and 72. The averaged gradient information registered in accumulator 71 is supplied through a divider 80, together with the average amplitude established by the identical divider 8, to an adder 9 which additively combines these two values to establish the desired threshold. A multiplier 91 supplies the aforedescribed corrective factor $k$ and may be adjustable between the upper and lower limits previously given, i.e. between $k=1$ and $k=1.5$. The effect of this arrangement will be discussed hereinafter with reference to FIG. 3.

If the supplemental registers 4 were not provided, and with omission of switch 10, the system of FIG. 2 would produce an output during any clock cycle in which the delayed signal amplitude from the intermediate output of register portion 32 exceeds the threshold signal supplied by computer 13, as determined by comparator 11. A single echo pulse of width $\tau$ reflected by a small target could nevertheless extend over parts of two consecutive clock cycles so that the output signal would have a duration $2\tau$. The presence of registers 4 and switchover means 10, however, enables a sharper pinpointing of the target location, registers 4 being stepped for this purpose by the timer 2 in staggered relationship with registers 3, i.e. at a time $\tau/2$ before or after the stepping of registers 3. Switch 10 is reversed in the same rhythm, thus carrying the information from register section 32 during the first half and the output of registers 4 in the second half of each clock cycle. The two signal amplitudes thus alternately delivered to switch 10 have undergone the same delay of $2^{p-1}+1$ clock cycles and are compared with the same threshold value derived once per clock cycle from the input and the output of registers 3.

With the arrangement just described, an output signal representing a legitimate target may have a minimum duration of $\tau/2$ and a maximum duration of $2\tau$. The succeeding discriminator C may therefore be adjusted to pass only those video pulses whose width ranges within these two limits, any other output being considered due to distributed reflectors and being therefore suppressed. Advantageously, this discriminator C may also reduce the width of longer output signals to $\tau$ so as to prevent an undesirable broadening of the mark produced on the screen of visualizer D.

If the incoming signals are stored in the reciver for a complete pulse cycle, e.g. in the manner disclosed in commonly owned application Ser. No. 376,883, filed June 22, 1964 by Fred Molho, now Patent No. 3,386,077, the amplitude information delivered to comparator 11 may be obtained from a corresponding stage of the receiver memory rather than from register portion 32 and auxiliary registers 4.

Graph (a) of FIG. 3 shows a density signal S reaching the receiver at a time $t_0$ and lasting for more than $2^p$ clock cycles. As the leading edge of this signal enters the registers 3 as well as the adder 62 from coder 1, accumulator 72 begins to register the integrated value of its amplitudes (the amplitude of S being here assumed to be constant) until, $2^p$ cycles later, this leading edge emerges from the output end of the registers so that no further increase in the accumulated value takes place. Graph (b) shows the same signal S' as it appears at the intermediate output of register section 32. Graph (c) illustrates the average amplitude A registered in divider 8, this average amplitude rising in proportion to the aforementioned integral from time $t_0$ to time $t_0+2^p$. Thereafter, the value A levels off as the magnitudes entering the registers 3 are balanced by those leaving the registers. When at a time $t_1$, the trailing edge of the density signal reaches the registers as well as the adder 62, the output of divider 8 begins to decline in proportion to the diminishing cumulative value of the magnitudes stored in the registers. At time $t_1+2^p$, the registers are substantially empty and the computed average decays to zero. Thus, the rise and the decline of the average A require each an interval of about $2^p$ cycles.

To accelerate the computation of the threshold, we may modify the arrangement of FIG. 2 so as to consider only an interval of $2^{p-1}$ clock cycles for this purpose. If this computation is based on the first $2^{p-1}$ stages, i.e. those of register section 31, the output of divider 8 will reach its maximum at time $t_0+2^{p-1}$ and the decay to zero will also be completed in about half the time previously required, i.e. at time $t_1+2^{p-1}$; this has been illustrated at $A_1$ in graph (d) of FIG. 3. If, on the other hand, register section 33 is utilized for this computation, the output $A_2$ of divider 8 will follow graph (e) which is offset by $2^{p-1}$ clock cycles from the curve $A_1$ of graph (d); the effect of the supernumerary middle stage has been disregarded in FIG. 3. By concurrently considering the two graphs (d) and (e) and always choosing the higher of the two values of their curves $A_1$ and $A_2$, we arrive at curve $A_3$ of graph (f) which is similar to curve A of graph (c) except for the steeper inclination of its flanks. It will thus be seen that the computed threshold value of graph (f) conforms more closely than that of graph (c) to the actual shape of the received density signal S', graph (b), as delayed by register section 31 on its way to comparator 11; graph $A^3$ has a plateau extending from time $t_0+2^{p-1}$ to time $t_1+2^{p-1}$, thus completely blanking the video signal S.

Graph (c) of FIG. 3 also shows, by a dotted line A', the effect of the increment-sensing circuit 51–53, 61, 71, 80 upon the threshold signal delivered by the computer 13 to comparator 11. It will be seen that the threshold thus modified reaches the level L of the signal ampltiude A ahead of the time $t_0+2^p$; line A' deviates from curve A at instant $t_0+1$ (upon the passage of the leading edge of signal A into the second register stages) and merges with it again at instant $t_0+2^p$ (emergence of the trailing edge from the penultimate stages). Multiplier 91, when set for a value of k greater than 1, supplies an additional margin of safety indicated in dot-dash lines at A'; it will be immediately apparent that this factor k should be held to a relatively low value, generally smaller than 2, so as not to obliterate useful signals.

The system of FIG. 4, designed to realize the mode of operation described in connection with graphs (d), (e) and (f) of FIG. 3, produces an output signal which reaches the threshold level L at time $t_0+2^{p-1}$ and remains at that level to the instant $t_1+2^{p-1}$ if $k=1$. In this system, in which the computer 13 of FIG. 2 has been simply represented as a block, registers 3 have been replaced by 2 separate groups of registers 31' and 33', each again with $2^{p-1}$ stages, a terminal one-stage section 32' of register group 31' corresponding to central register section 32 of FIG. 3.

In the system of FIG. 4, the inputs of computer 13 receive only the signal amplitudes entering and leaving the section 31'; the resulting threshold value, which may or may not be modified by an incremental addend and/or by a corrective factor k, is then applied in parallel to the input of register section 33' and to a comparison circuit 14 which also receives the output of that register section. Thus, register section 33' stores the threshold values $A_1$, based upon an interval of $2^{p-1}$ clock cycles, for an additional $2^{p-1}$ clock cycles so that two such thresholds $A_1$, $A_2$, representing the average of amplitudes occurring before and after a signal to be evaluated, are available at any time for comparison with the output of register section 32'. Comparison circuit 14 selects the larger of these two values and, accordingly, opens one of two AND gates 15', 15'' to pass either the output of computer 13 or the stored threshold from register 33' to comparator 11 by way of an OR gate 20.

FIG. 5 illustrates the possibility of establishing an azimuthal window for the detection of density zones. Here the coder 1 supplies its signal information to a chain of memories 16(1) ... 16(N), 16(N+1) ... 16(2N) which are stepped by the timer 2 so as to transfer their message contents from one memory to the next in the rhythm of the emitted video pulses. Each of these memories has a sufficient number of levels to register, again in binary form, the echo signals received during consecutive clock cycles or quanta τ between successive video pulses; corresponding levels are concurrently sampled by the timer to transmit their stored information to a selector 17 which also receives the instantaneous output of coder 1. Selector 17 chooses the signal of maximum ampltiude delivered to it during any clock cycle and feeds it to the shift registers 3 for application to the computer 13 in the manner previously described. Comparator 11 matches the output of the computer against a video signal from the midpoint of the memory chain 16(1) ... 16(2N), i.e. from the output of memory 16(N).

Thus, if $T \gg \tau$ represents a video-pulse interval, comparator 11 receives from the memory chain a delayed signal chosen from the center of an area whose depth in the radial direction corresponds to the extent of a range window $\tau(2^p+1)$ and whose width in the azimuthal direction equals $2NT\omega$ where ω is the angular velocity of the antenna AA. If exploration in depth is not required, computer 13 may be connected directly across the chain of memories 16(1) ... 16(2N) in a manner analogous to its connection across the several register stages in FIG. 2.

As illustrated in FIG. 6, the system of FIG. 5 may be modified in a manner similar to that of FIG. 4 by connecting the computer 13, together with its registers 3, across only the first half of the memory chain, i.e. units 16(1) through 16(N), through the intermediary of a peak-amplitude selector 17' and to store the output of the computer in corresponding levels of the other memories 16(N+1) through 16(2N) which work into another such selector 17'', a comparison circuit 140 choosing from among the outputs of computer 13 and selector 17'' in the manner described with reference to comparator 14 of FIG. 4. Circuit 140 unblocks either of two AND gates 150', 150'' to deliver the selected threshold value through an OR gate 200 to comparator 11.

FIG. 7 illustrates another modification wherein the threshold signal from OR gate 20 of FIG. 4 is shifted to all the units of a memory chain 16(1) ... 16(N) working into the peak-amplitude selector 17 of FIG. 5;

the output of this selector is then applied to comparator 11 which also receives the delayed video signal from register section 32'. In a similar manner the output of computer 13 in FIG. 2 may be routed through such a memory chain and a peak-amplitude selector before being fed to comparator 11. Thus, the system of FIG. 7 differs from that of FIG. 5 essentially by an inversion of the relative positions of the threshold computer and the azimuthal memory chain.

Although in the preceding embodiments we have described a direct comparison between the computed threshold value and the amplitude of a delayed video signal, we may also utilize such threshold value to modify the amplitude of the video signal instead of suppressing it entirely. Thus, the radar receiver may comprise a multistage amplifier, preferably of logarithmic gain to prevent overloading, whose individual stage outputs may terminate at a selector responsive to the magnitude of the threshold, the selector choosing an output of an earlier stage (i.e. a signal of smaller amplitude) in response to larger threshold values and the output of a later stage (i.e. a signal of larger amplitude) in response to lower threshold values. This has been illustrated in FIG. 8 which shows such a multistage amplifier 18 whose individual stages, here four, have been designated 181, 182, 183, 184. Computer 13 of density-zone suppressor B, which receives the final output of amplifier 18 through the coder 1 shown in FIG. 2, delivers its threshold value to a gain selector 19 which, in accordance with the magnitude of the computer output, connects one of several output leads 191, 192, 193, 194 to the pulse-width discriminator C. If desired, another computer 13 may be inserted between selector 19 and discriminator C, the latter computer functioning in the manner described in connection with FIG. 2 or 4.

We claim:

1. In a radar installation having transmitting means for periodically sending out video pulses and receiving means responsive to echoes of said video pulses reflected by extraneous targets, the combination therewith of register means for temporarily storing the magnitudes of a succession of said echoes occurring throughout a period of predetermined length, computer means for averaging the magnitudes so stored and deriving a reference signal therefrom, and circuit means connected to said receiving means independently of said computer means and further connected to said computer means for applying incoming echo signals to a load with progressively reduced amplitudes in response to increasing values of said reference signal; said register means having an intermediate output for delivering a delayed echo signal occurring substantially midway within said period, said circuit means being connected to said receiving means by way of said intermediate output and including comparison means for measuring said delayed echo signal against said reference signal.

2. The combination defined in claim 1 wherein said register means comprises a set of $n$ parallel shift registers, $n$ being the maximum number of bits required to register said magnitudes in binary form, further comprising timer means for periodically stepping said shift registers at the end of consecutive clock cycles of duration $\tau$ representing a small fraction of the recurrence period of said video pulses.

3. The combination defined in claim 2 wherein said duration $\tau$ is substantially equal to the width of a video pulse.

4. The combination defined in claim 2 wherein each of said shift registers has $2^p+1$ stages, $p$ being a positive integer greater than 1, said intermediate output being connected to the $(2^{p-1}+1)^{th}$ stage of each register.

5. The combination defined in claim 4 wherein said register means further includes a set of $n$ supplemental shift registers each with $2^{p-1}+1$ stages, said supplemental shift registers being connected in parallel with the first-mentioned shift registers to said receiving means and being coupled to said timer means for stepping at the half-point of each clock cycle thereof, further comprising switchover means controlled by said timer means for alternately connecting, at intervals $\tau/2$, said intermediate output and the output of the last stages of said supplemental shift registers to said comparison means.

6. The combination defined in claim 2, further comprising a pulse-width discriminator connector to the output of said comparison means for suppressing target indications having a duration greater than $2\tau$.

7. The combination defined in claim 2 wherein said set of shift registers is divided into a first group and a second group of $n$ registers each, each group having substantially the same number of stages in each register, said computer means having input connections to the registers of said first group and having an output connected to the first stage of each register of said second group for delivering thereto a variable representing the value of said reference signal as computed from the magnitudes stored in said first group, further comprising comparator means inserted between said computer means and said comparison means and further connected to the last stage of each register of said second group for selecting the larger variable from the respective outputs of said computer means and said second group for delivery to said comparison means.

8. The combination defined in claim 2 wherein each of said shift registers has a multiplicity of stages, said computer means comprising an adding circuit connected to an input portion of said shift registers, a subtracting circuit connected to an output portion of said shift registers, accumulator means for registering the difference between the sum of all values delivered to said adding circuit and the sum of all values delivered to said subtracting circuit, and averaging means for dividing said difference by a number substantially equal to the number of said stages.

9. The combination defined in claim 8 wherein said adding circuit includes a first subtractor connected across the first stages of said shift registers for deriving therefrom incoming increments of magnitudes fed to said registers, said subtraction circuit including a second subtractor connected across the last stages of said registers for deriving therefrom outgoing increments of magnitudes leaving said registers, said computer means further including a third subtractor connected to receive the outputs of said first and second subtractors for deriving therefrom the difference between the sums of said incoming and outgoing increments, and arithmetical means for dividing the last-mentioned difference by a number substantially equal to the number of said stages and combining the result with the output of said averaging means to generate said reference signal.

10. The combination defined in claim 2 wherein said computer means includes a multiplier for increasing the output of said averaging means by a factor greater than 1 but at most equal to 1.5.

11. In a radar installation having rotatable transmitting means for periodically sending out video pulses in different azimuthal directions and receiving means responsive to echoes of said video pulses reflected by extraneous targets, the combination therewith of register means for temporarily storing the magnitudes of a succession of said echoes occurring throughout a period of predetermined length, said register means comprising a chain of memories each adapted to store all the echoes arriving during a pulse interval; timer means periodically stepping said chain in the rhythm of said video pulses to shift the stored echoes from one memory thereof to the next; computer means for averaging the magnitudes so stored and deriving a reference signal therefrom; and circuit means connected to said receiving means independently of said computer means and further connected to said computer means for applying incoming echo signals to a load with progressively reduced amplitudes in response to increasing values of said reference signal; said register means further comprising a set of $n$ parallel shift registers for storing said magnitudes in binary form with up to $n$ bits, said shift registers being connected to said timer means for being periodically stepped thereby at the end of consecutive clock cycles of duration $\tau$ representing a small fraction of said pulse interval, said chain being provided with evaluating means controlled by said timer means to scan said memories concurrently during each pulse interval and to select at any time the largest magnitude stored in corresponding portions of said memories for delivery to said shift registers.

12. In a radar installation having transmitting means for periodically sending out video pulses and receiving means including a multistage amplifier responsive to echoes of said video pulses reflected by extraneous targets, the combination therewith of register means for temporarily storing the magnitudes of a succession of said echoes occurring throughout a period of predetermined length, computer means for averaging the magnitudes so stored and deriving a reference signal therefrom, and circuit means connected to said receiving means independently of said computer means and further connected to said computer means for applying incoming echo signals to a load with progressively reduced amplitudes in response to increasing values of said reference signal; said circuit means comprising a set of output leads extending from the individual stages of said amplifier and selector means for activating one of said output leads in dependence upon the magnitude of said reference signal.

References Cited

UNITED STATES PATENTS

| | | | |
|---|---|---|---|
| 3,196,434 | 7/1965 | Cutler | 343—7 |
| 3,312,969 | 4/1967 | Halsted | 343—5 |
| 3,380,018 | 4/1968 | Littrell et al. | 343—7 X |
| 3,430,235 | 2/1969 | Bender et al. | 343—7 |

RODNEY D. BENNETT, JR., Primary Examiner

T. H. TUBBESING, Assistant Examiner

U.S. Cl. X.R.

343—5